United States Patent
Chang

(10) Patent No.: US 10,042,801 B2
(45) Date of Patent: Aug. 7, 2018

(54) SYSTEM FOR DETECTING UNIVERSAL SERIAL BUS (USB) DEVICE AND METHOD THEREOF

(71) Applicant: GENESYS LOGIC, INC., New Taipei (TW)

(72) Inventor: Nai-Jen Chang, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 341 days.

(21) Appl. No.: 14/548,593

(22) Filed: Nov. 20, 2014

(65) Prior Publication Data

US 2015/0143138 A1   May 21, 2015

(30) Foreign Application Priority Data

Nov. 21, 2013  (TW) .............................. 102142529 A

(51) Int. Cl.
G06F 13/38 (2006.01)

(52) U.S. Cl.
CPC ........ *G06F 13/385* (2013.01); *Y02B 60/1228* (2013.01); *Y02B 60/1235* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 7,904,625 | B1 | 3/2011 | Jiang et al. |
| 7,908,414 | B2 | 3/2011 | Combs et al. |
| 7,945,711 | B2 | 5/2011 | Kim et al. |
| 2002/0169915 | A1 | 11/2002 | Wu |
| 2003/0052547 | A1* | 3/2003 | Fischer .............. H01R 13/6675 307/154 |
| 2005/0134321 | A1* | 6/2005 | Ede ........................ G06F 1/3203 327/1 |
| 2008/0222438 | A1* | 9/2008 | Lin ........................ G06F 13/385 713/340 |
| 2009/0240843 | A1* | 9/2009 | Payrat ................... G06F 13/385 710/16 |
| 2011/0241627 | A1* | 10/2011 | Arai ...................... H02J 7/0031 320/162 |
| 2015/0058642 | A1* | 2/2015 | Okamoto ................ G06F 13/14 713/300 |

FOREIGN PATENT DOCUMENTS

| JP | 05274059 A | 10/1993 |
| JP | 10049269 A | 2/1998 |
| JP | 2002353994 A | 12/2002 |
| JP | 2007316972 A | 12/2007 |
| JP | 2013145430 A | 7/2013 |
| TW | 200830103 | 7/2008 |

* cited by examiner

*Primary Examiner* — Kim Huynh
*Assistant Examiner* — Danny Chan
(74) *Attorney, Agent, or Firm* — Hauptman Ham, LLP

(57) ABSTRACT

A system for detecting universal serial bus (USB) device and method thereof are described. The system and method utilizes a USB controller to control a switch module and to detect the signal level of USB interface for determining whether the USB device is electrically connected to the host unit. Therefore, the system and method are capable of improving the power consumption of the host unit.

9 Claims, 3 Drawing Sheets

SYSTEM FOR DETECTING UNIVERSAL SERIAL BUS (USB) DEVICE AND METHOD THEREOF

CROSS REFERENCE TO RELATED APPLICATION

This application claims the priority of Taiwan Patent Application No. 102142529, filed on Nov. 21, 2013.

FIELD OF THE INVENTION

The present invention relates to a detecting system and method thereof, and more particularly to a detecting system for universal serial bus (USB) device and method thereof to detect whether the USB device is electrically connected to the host unit.

BACKGROUND OF THE INVENTION

With the rapid development of the information technology, the electronic products such as portable electronic products, e.g. notebook computer, cell phone, and tablet computer, are widely used. Since these portable electronic products may be carried and utilized by the user anytime and anywhere for the purpose of mass data transmission between these portable electronic products by device interconnections, thus there is a need to connect a portable electronic product to a host unit such that the host unit is capable of supplying the power to the portable electronic product via the USB connection and performs data transmission therebetween using USB protocol. However, conventionally, when a portable electronic product is connected to the host unit via an electrical connector, the host unit detect whether the portable electronic product is inserted to the USB port of the host unit by using a contact pin of the electrical connector. Further, the contact pin is not a standard hardware component of the USB connector, result in the inconvenient utilization between the portable electronic product and the host unit. More over, if the portable electronic product is connected to the host unit by a USB extension wire, the host unit malfunctions to supply the power to the portable electronic product with the high power consumption. Consequently, there is a need to develop a novel detecting system and method to solve the aforementioned problems.

SUMMARY OF THE INVENTION

One objective of the present invention provides a detecting system for universal serial bus (USB) device and method thereof to detect whether the USB device is electrically connected to the host unit. Specifically, the USB controller controls the switch module to detect the levels of the power contact and the data contacts of the USB interface to determine whether the USB device is electrically connected to the host unit to advantageously save the power consumption of the host unit. While the USB device is connected to the host unit by the USB extension wire, the detecting system and method of the present invention is capable of exactly detecting whether the USB device is connected to the host unit.

According to the above objective, the present invention sets forth a detecting system for universal serial bus (USB) device and method thereof. In the first embodiment, the detecting system for a universal serial bus (USB) device to determine whether the USB device is electrically connected to a host unit, the detecting system comprising: a power unit, for outputting a first power signal and a second power signal; a USB interface coupled to the power unit, having a power contact and a plurality of data contacts wherein the USB interface module selectively receives the first power signal and the second power signal; a switch module coupled to the power unit and the USB interface, for switching the power unit to output either one or both of the first power signal and the second power signal to the power contact; and a USB controller coupled to the power unit, the USB interface and the switch module, for controlling the switch module to switch the power unit and for determining whether a first level of the power contact is less than a first predetermined level, wherein the USB device is electrically connected to the host unit when the first level is less than the first predetermined level.

In one case, the switch module comprises: a first switch device, for controlling the power unit to output the first power signal to the power contact of the USB interface when the USB controller enables the first switch device, wherein a second switch device controls the power unit not to output the second power signal to the power contact of the USB interface when the USB controller disables the second switch device; and the second switch device, for controlling the power unit to output the second power signal to the power contact of the USB interface so that the host unit actuates the USB device when the USB controller enables the second switch device. The USB controller determines whether a second level of the data contacts is unequal to a second predetermined level when the first level is equal to the first predetermined level, and the USB device is electrically connected to the host unit if the second level of the data contacts is unequal to the second predetermined level.

In the second embodiment, the detecting system for a universal serial bus (USB) device to determine whether the USB device is electrically connected to a host unit, the detecting system comprising: a power unit, for outputting a power signal; a USB interface coupled to the power unit, having a power contact, a plurality of data contacts and a ground contact wherein the USB interface receives the power signal; a comparing unit coupled to the USB interface, for comparing a level of the ground contact with a level of a reference signal to determine whether the level of the ground contact is equal to the level of a reference signal; a switch module coupled to the USB interface and the comparing unit, for switching the USB interface and the comparing unit to either connect the ground contact to the comparing unit or allow the ground contact and the comparing unit to receive a ground signal, wherein a level of the ground signal is different from the level of the reference signal; and a USB controller coupled to the switch module and the USB interface, for controlling the switch module to switch the USB interface and the comparing unit, wherein when the USB device is electrically connected to the USB interface, the USB device generates the ground signal on the ground contact of the USB interface to allow the comparing unit to output a high level signal, and wherein when the USB device is not electrically connected to the USB interface, the USB device does not generate the ground signal on the ground contact of the USB interface to allow the comparing unit to output a low level signal.

In the third embodiment, the detecting method for a universal serial bus (USB) device to determine whether the USB device is electrically connected to a host unit, wherein the detecting method is applicable to a detecting system comprising a power unit, a USB interface, a USB controller and a switch module, the USB interface comprises a power contact and a plurality of data contacts, and the switch module comprises a first switch device and a second switch device, the detecting method comprising the steps of: (a) controlling the power unit to output the first power signal to the power contact of the USB interface when the USB controller enables the first switch device, wherein a second switch device controls the power unit not to output the second power signal to the power contact of the USB interface when the USB controller disables the second switch device; (b) determining whether a first level of the power contact is less than a first predetermined level by the USB controller, wherein the USB device is electrically connected to the host unit and the step (c) is then performed when the first level is less than the first predetermined level; and (c) controlling the power unit to output the second power signal to the power contact of the USB interface so that the host unit actuates the USB device when the USB controller enables the second switch device. In one embodiment, if the first level of the power contact is equal to the first predetermined level during the step (b), the USB controller determines whether a second level of the data contacts is unequal to a second predetermined level when the first level is equal to the first predetermined level, and the USB device is electrically connected to the host unit if the second level of the data contacts is unequal to the second predetermined level, and the step (c) is then performed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
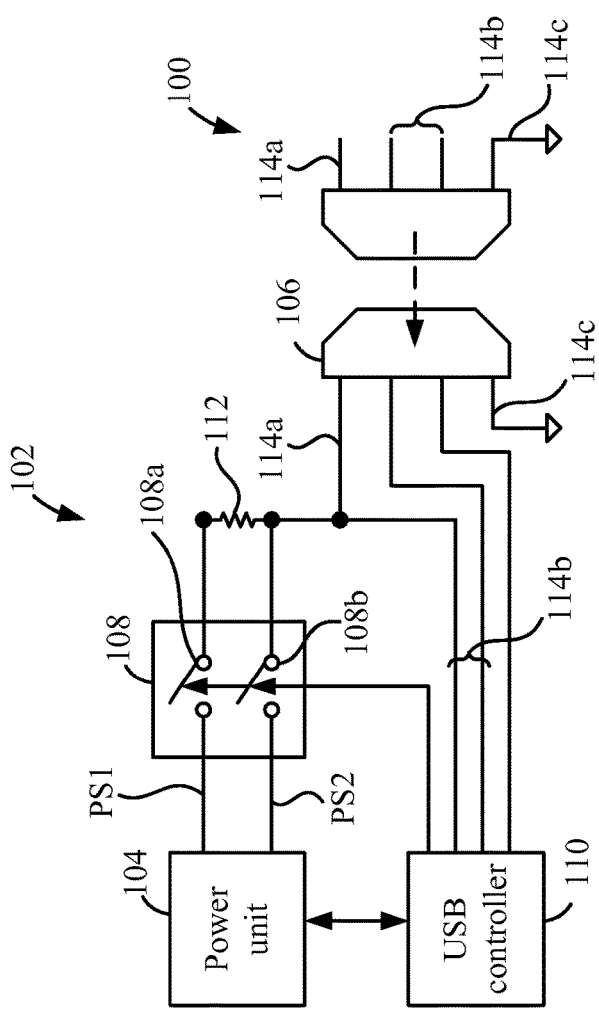
FIG. 1 is a schematic block diagram of a detecting system for a universal serial bus (USB) device according to a first embodiment of the present invention.

FIG. 1 is a schematic block diagram of a detecting system 102 for a universal serial bus (USB) device 100 according to a first embodiment of the present invention. The detecting system 102 is capable of detecting whether USB device connects a host unit (not shown) and comprises a power unit 104, USB interface 106, a switch module 108, a USB controller 110 and a resistor 112.

In FIG. 1, the power unit 104 outputs a first power signal PS1 and a second power signal PS2. For example, the power unit 104 is the power supply system of the host unit. In one embodiment, the current value of the first power signal PS1, e.g. the power of standby mode, sleep mode, hibernate mode or hybrid sleep mode of the host unit, is less than that of the second power signal PS2, e.g. the standard power mode of the USB device from the host unit. In one case, the first level of the first power signal PS1 is equal to the level of the second power signal PS2. For example, both the first level of the first power signal PS1 and the level of the second power signal PS2 are five voltages (V), but not limited, e.g. three voltages. In another case, the first level of the first power signal PS1 is unequal to the level of the second power signal PS2. For example, one is 5V and the other is 3V.

As shown in FIG. 1, the USB interface 106 is coupled to the power unit 104 via the switch module 108 and includes a power contact 114a and a plurality of data contacts 114b. For example, the power contact 114a is the contact pin "VBUS" defined in the USB standard protocol and the data contacts 114b are the data contact pins "D+" and "D−" defined in the USB standard protocol. The USB interface module selectively receives the first power signal PS1 and the second power signal PS2. In other words, the detecting system 102 controls the switch module 108 to switch the power unit 104 so that the switch module selectively switches the power unit to output either one or both of the first power signal PS1 and the second power signal PS2.

In FIG. 1, the switch module 108 is coupled to the power unit 104 and the USB interface 106 for switching the power unit 104 to output either one or both of the first power signal PS1 and the second power signal PS2 to the power contact 114a.

Specifically, the switch module 108 includes a first switch device 108a and a second switch device 108b. The first switch device 108a controls the power unit 104 to output the first power signal PS1 to the power contact 114a of the USB interface 106 when the USB controller 110 enables the first switch device 108a wherein the second switch device 108b controls the power unit 104 not to output the second power signal PS2 to the power contact 114a of the USB interface 106 when the USB controller 110 disables the second switch device 108b. The second switch device 108b controls the power unit 104 to output the second power signal PS2 to the power contact 114a of the USB interface 106 so that the host unit actuates the USB device 100 when the USB controller 110 enables the second switch device 108b.

As shown in FIG. 1, the USB controller 110 is coupled to the power unit 104, the USB interface 106 and the switch module 108 for controlling the switch module 108 to switch the power unit 104 and the USB controller 110 determines whether a first level of the power contact is less than a first predetermined level, wherein the USB device 100 is electrically connected to the host unit when the first level is less than the first predetermined level. In one embodiment, if the USB device 100 is connected to the host unit and the USB device 100 itself has no power source, the power contact 114a of the USB device receives the power signal, e.g. the second power signal PS2, provided by the power unit 104 via the USB interface 106.

In the embodiment of FIG. 1, the USB controller 110 determines whether a second level of the data contacts 114b is unequal to a second predetermined level when the first level is equal to the first predetermined level. If the second level of the data contacts 114b is unequal to the second predetermined level, the USB device 100 is electrically connected to the host unit. In one embodiment, if the USB device 100 is connected to the host unit and the USB device 100 provides power for itself, the USB controller 110 determines whether the second level of the data contacts 114b are changed by checking the variation of the second level before the USB device 100 is not connected to the host unit. When the second level is changed, it represents that the USB device 100 is connected to the host unit.

In one preferred embodiment, a resistor 112 is coupled to the first switch device 108a to the power contact 114a for controlling the USB device 100 to adjust a current value of the first power signal PS1 via the power contact 114a.

Figure 2:
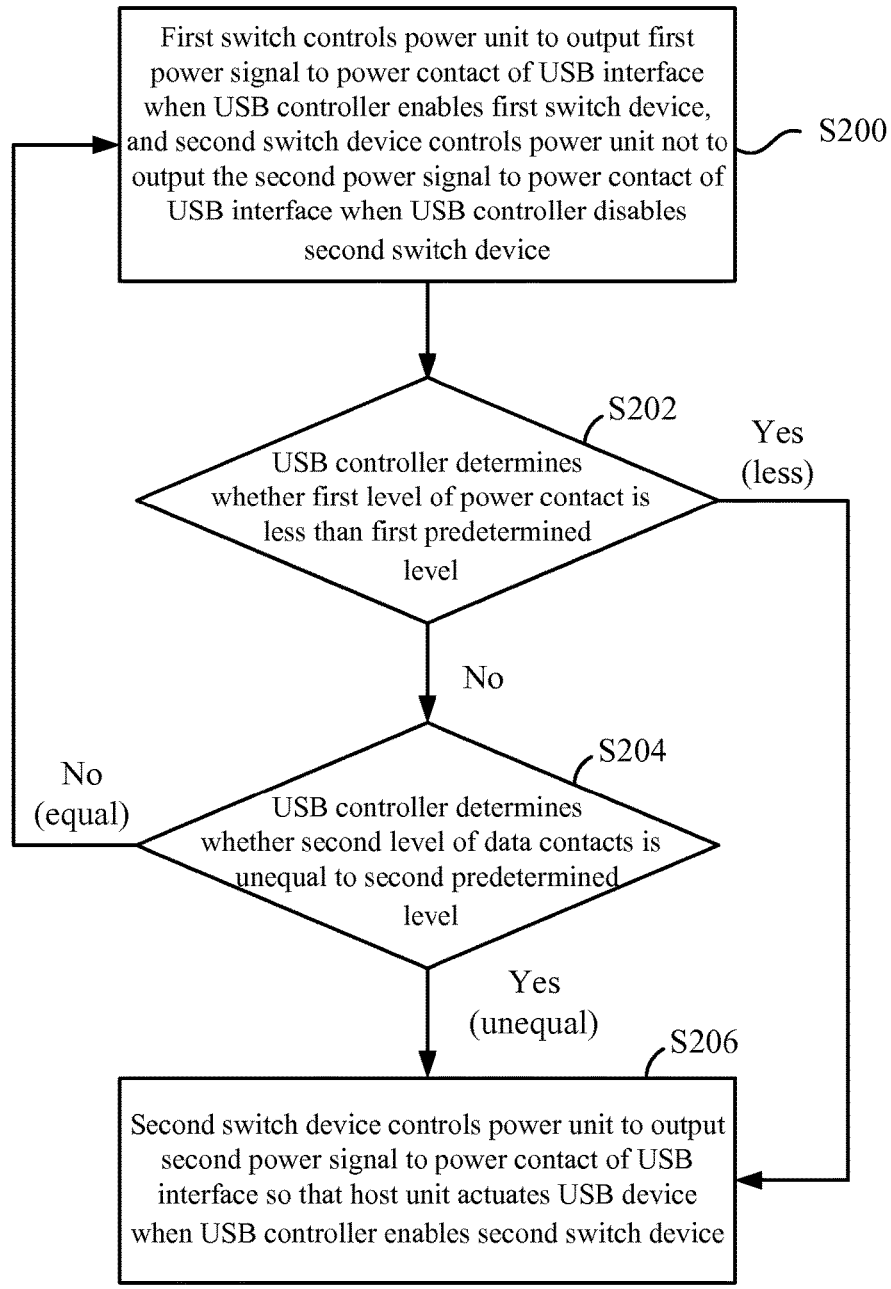
FIG. 2 is a flow chart of a detecting method for the USB device applicable to the detecting system shown in FIG. 1 according to the first embodiment of the present invention.

Referring to FIG. 1 and FIG. 2, FIG. 2 is a flow chart of a detecting method for the USB device applicable to the detecting system 102 shown in FIG. 1 according to the first embodiment of the present invention. A detecting method for the USB device 100 determines whether the USB device 100 is electrically connected to a host unit wherein the detecting method is applicable to a detecting system 102. The detecting system 102 comprises a power unit 104, a USB interface 106, a USB controller 110 and a switch module 108 wherein the USB interface 106 comprises a power contact 114a and a plurality of data contacts 114b, and the switch module 108 comprises a first switch device 108a and a second switch device 108b. The detecting method includes the following steps.

In the step S200, the first switch 108a controls the power unit 104 to output the first power signal PS1 to the power contact 114a of the USB interface 106 when the USB controller 110 enables the first switch device 108a wherein a second switch device 108b controls the power unit 104 not to output the second power signal PS2 to the power contact 114a of the USB interface 106 when the USB controller 110 disables the second switch device 108b.

In one embodiment, the current value of the first power signal PS1, e.g. the power of standby mode, sleep mode, hibernate mode or hybrid sleep mode of the host unit, is less than that of the second power signal PS2, e.g. the standard power mode of the USB device from the host unit. In one case, the first level of the first power signal PS1 is equal or unequal to the level of the second power signal PS2. For example, both the first level of the first power signal PS1 and the level of the second power signal PS2 are five voltages (V), but not limited, e.g. three voltages. In another case, the first level of the first power signal PS1 is unequal to the level of the second power signal PS2. For example, one is 5V and the other is 3V.

In the step S202, the USB controller 110 determines whether a first level of the power contact 114a is less than a first predetermined level wherein the USB device 100 is electrically connected to the host unit and the step (c) is then performed when the first level is less than the first predetermined level. The step S204 is performed when the first level is not less than the first predetermined level.

In the step S204, if the first level of the power contact is equal to the first predetermined level during the step S202, the USB controller 110 determines whether a second level of the data contacts 114b is unequal to a second predetermined level when the first level is equal to the first predetermined level, and the USB device 100 is electrically connected to the host unit if the second level of the data contacts 114b is unequal to the second predetermined level, and the step S206 is then performed. If the second level of the data contacts 114b is equal to a second predetermined level, return the step S200.

In the step S206, the second switch device 108b controls the power unit 104 to output the second power signal to the power contact 114a of the USB interface 106 so that the host unit actuates the USB device 100 when the USB controller 110 enables the second switch device 108b. In one embodiment, the USB controller 110 either enables or disables the first switch device 108a during the step S206.

According to the above-mentioned descriptions, the detecting system for universal serial bus (USB) device and method thereof to detect whether the USB device is electrically connected to the host unit. Specifically, the USB controller controls the switch module to detect the levels of the power contact and the data contacts of the USB interface to determine whether the USB device is electrically connected to the host unit to advantageously save the power consumption of the host unit. While the USB device is connected to the host unit by the USB extension wire, the detecting system and method of the present invention is capable of exactly detecting whether the USB device is connected to the host unit.

Figure 3:
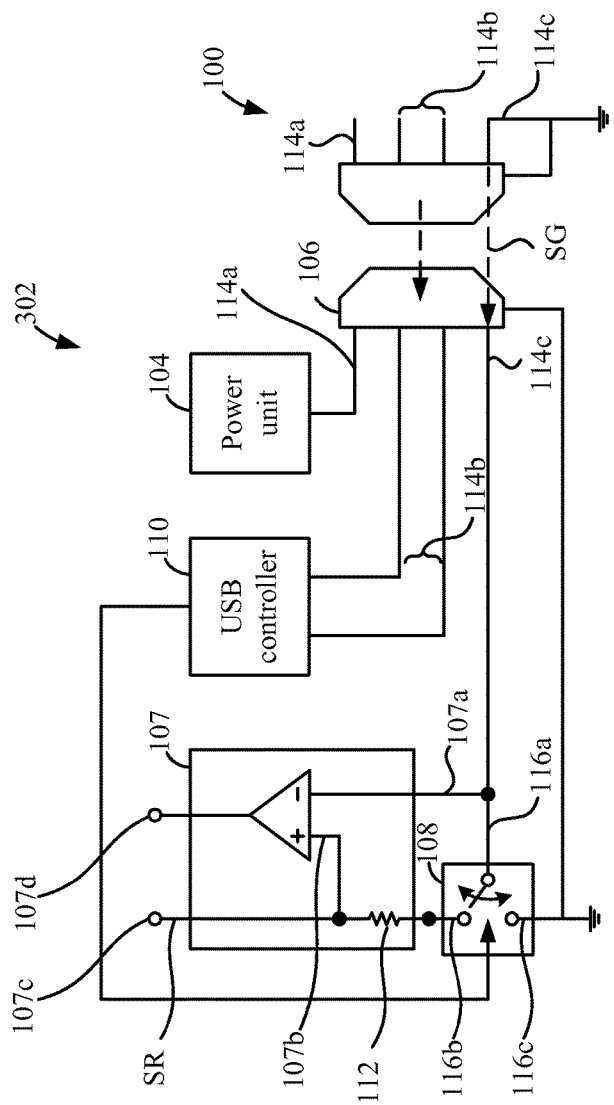
FIG. 3 is a schematic block diagram of a detecting system for the USB device according to a second embodiment of the present invention.

FIG. 3 is a schematic block diagram of a detecting system 302 for the USB device 100 according to a second embodiment of the present invention. The detecting system 302 for the USB device 100 determines whether the USB device 100 is electrically connected to a host unit. The detecting system 302 comprises a power unit 104, a USB interface 106, a comparing unit 107, a switch module 108, a USB controller 110 and resistor 112. The power unit 104 outputs a power signal to the USB interface 106. The USB interface 106 is coupled to the power unit 104 and includes a power contact 114a, a plurality of data contacts 114b and a ground contact 114c wherein the USB interface 106 receives the power signal PS.

As shown in FIG. 3, the comparing unit 107 is coupled to the USB interface 106 and the switch module 108 for comparing a level of the ground contact 114c with a level of a reference signal SR to determine whether the level of the ground contact is equal to the level of a reference signal. The switch module 108 is coupled to the USB interface 106 and the comparing unit 108 for switching the USB interface 106 and the comparing unit 107 to either connect the ground contact 114c to the comparing unit 107 or allow the ground contact 114c and the comparing unit 107 to receive a ground signal SG, wherein a level of the ground signal SG is different from the level of the reference signal SR.

In FIG. 3, the USB controller 110 is coupled to the switch module 108 and the USB interface 106, for controlling the switch module 108 to switch the USB interface 106 and the comparing unit 107. When the USB device 100 is electrically connected to the USB interface 106, the USB device 100 generates the ground signal SG on the ground contact 114c of the USB interface 106 to allow the comparing unit 107 to output a high level signal, and when the USB device 100 is not electrically connected to the USB interface 106, the USB device 100 does not generate the ground signal SG on the ground contact 114c of the USB interface 106 to allow the comparing unit 107 to output a low level signal. It should be noted that the ground contact 114c of the USB device 100 generates the ground signal SG with low impedance value.

As shown in FIG. 3, the comparing unit 107 further comprises a first input terminal 107a, a second input terminal 107b, a reference terminal 107c and an output terminal 107d. The first input terminal 107a is coupled to the ground contact 114c, the comparing unit 107 and the switch module 108. The second input terminal 107b is selectively coupled to the first input terminal 107a and the switch module 108 for receiving the ground signal SG. The reference terminal 107c generates the reference signal SR. The output terminal 107d outputs the high level signal when the USB device 100 is electrically connected to the USB interface 106, and the output terminal 107d outputs the low level signal when the USB device 100 is not electrically connected to the USB interface 106.

In FIG. 3, the switch module further comprises a common terminal 116a, a first switch terminal 116b, a second switch terminal 116c. The common terminal 116a is coupled to the first input terminal 107a and the ground contact 114c for receiving the ground signal SG from the USB device 100. The first switch terminal 116b is coupled to the second input terminal 107b of the comparing unit 107 for receiving the reference signal SR. The second switch terminal 116c is coupled to the USB interface 106, e.g. the shell (not shown) of the USB interface 106.

In one preferred embodiment, the resistor 112 is coupled to the switch module 108 and the comparing unit 107 for controlling the USB device 100 to adjust a current value of the reference signal SR via the ground contact 114c. In one embodiment, the resistor 112 is integrated into the comparing unit 107 or independently disposed outside the comparing unit 107.

According to the above-mentioned descriptions, the detecting system for universal serial bus (USB) device and method thereof to detect whether the USB device is electrically connected to the host unit. Specifically, the USB controller controls the switch module to detect the levels of the power contact and the data contacts of the USB interface to determine whether the USB device is electrically connected to the host unit to advantageously save the power consumption of the host unit. While the USB device is connected to the host unit by the USB extension wire, the detecting system and method of the present invention is capable of exactly detecting whether the USB device is connected to the host unit.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A detecting system for a universal serial bus (USB) device to determine whether the USB device is electrically connected to a host unit, the detecting system comprising:
a power unit, for outputting a first power signal and a second power signal;
a USB interface coupled to the power unit, having a power contact and a plurality of data contacts wherein the USB interface selectively receives the first power signal and the second power signal;
a switch module coupled to the power unit and the USB interface, for switching the power unit to output either one or both of the first power signal and the second power signal to the power contact; and
a USB controller coupled to the power unit, the USB interface and the switch module, for controlling the switch module to switch the power unit and for determining whether a first level of the power contact is less than a first predetermined level, wherein the USB device is electrically connected to the host unit when the first level of the power contact is less than the first predetermined level,
wherein the USB controller determines whether a second level of the data contacts is unequal to a second predetermined level when the first level of the power contact is equal to the first predetermined level, and the USB device is electrically connected to the host unit if the second level of the data contacts is unequal to the second predetermined level,
wherein the switch module outputs the second power signal to the power contact of the USB interface when the USB controller determines the USB device is electrically connected to the host so that the host unit is configured to drive the USB device when the USB controller enables a second switch device of the switch module.

2. The detecting system of claim 1, wherein the switch module comprises:
a first switch device, for controlling the power unit to output the first power signal to the power contact of the USB interface when the USB controller enables the first switch device, wherein the second switch device controls the power unit not to output the second power signal to the power contact of the USB interface when the USB controller disables the second switch device; and
the second switch device, for controlling the power unit to output the second power signal to the power contact of the USB interface so that the host unit is configured to drive the USB device when the USB controller enables the second switch device.

3. The detecting system of claim 2, further comprising a resistor coupled to the first switch device to the power contact for controlling the USB device to adjust a current value of the first power signal via the power contact.

4. The detecting system of claim 1, wherein a current value of the first power signal is less than a current value of the second power signal.

5. The detecting system of claim 1, wherein the first level of the first power signal at the power contact is either equal or unequal to a third level of the second power signal.

6. A detecting method for a universal serial bus (USB) device to determine whether the USB device is electrically connected to a host unit, wherein the detecting method is applicable to a detecting system comprising a power unit, a USB interface, a USB controller and a switch module, the USB interface comprises a power contact and a plurality of data contacts, and the switch module comprises a first switch device and a second switch device, the detecting method comprising the steps of:
(a) controlling the power unit to output a first power signal to the power contact of the USB interface when the USB controller enables the first switch device, wherein a second switch device controls the power unit not to output a second power signal to the power contact of the USB interface when the USB controller disables the second switch device;
(b) determining whether a first level of the power contact is less than a first predetermined level by the USB controller, wherein the USB device is electrically connected to the host unit and the step (c) is then performed when the first level of the power contact is less than the first predetermined level, wherein the USB controller determines whether a second level of the data contacts is unequal to a second predetermined level when the first level of the power contact is equal to the first predetermined level, and the USB device is electrically connected to the host unit if the second level of the data contacts is unequal to the second predetermined level, and the step (c) is then performed; and
(c) controlling the power unit to output the second power signal to the power contact of the USB interface so that the host unit is configured to drive the USB device when the USB controller enables the second switch device.

7. The detecting method of claim 6, wherein a current value of the first power signal is less than a current value of the second power signal.

8. The detecting method of claim 6, wherein the first level of the first power signal at the power contact is either equal or unequal to a second level of the second power signal.

9. The detecting method of claim 6, wherein the USB controller either enables or disables the first switch device during the step (c).

\* \* \* \* \*